Aug. 6, 1940.  E. L. WISE  2,210,558
AUTOMATIC SHUTTLE CARRIAGE MECHANISM
Filed July 2, 1937  3 Sheets-Sheet 1
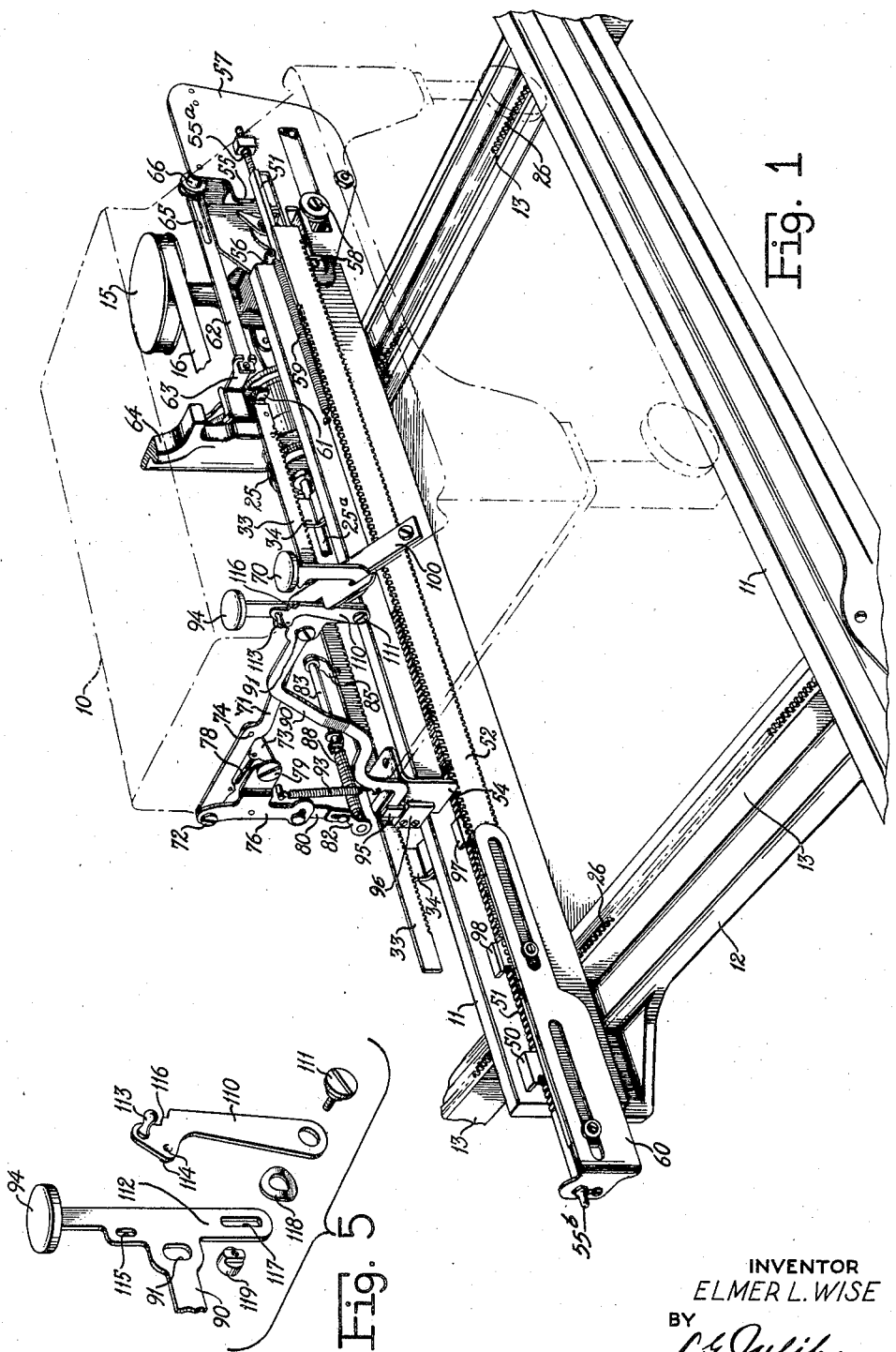
INVENTOR
ELMER L. WISE
BY
L. G. Julihn
ATTORNEY

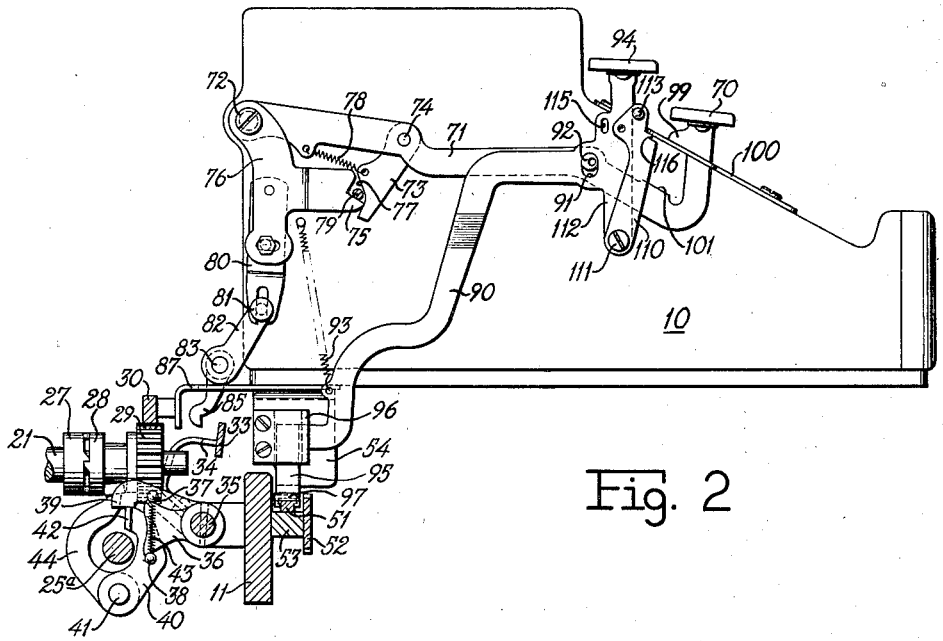

Aug. 6, 1940.  E. L. WISE  2,210,558

AUTOMATIC SHUTTLE CARRIAGE MECHANISM

Filed July 2, 1937  3 Sheets-Sheet 3

INVENTOR
ELMER L. WISE
BY
*L. G. Julihn*
ATTORNEY

Patented Aug. 6, 1940

2,210,558

UNITED STATES PATENT OFFICE 2,210,558

AUTOMATIC SHUTTLE CARRIAGE MECHANISM

Elmer L. Wise, Bridgeport, Conn., assignor to Underwood Elliott Fisher Company, New York, N. Y., a corporation of Delaware Application July 2, 1937, Serial No. 151,687

4 Claims. (Cl. 197—66)

This improvement relates to carriage return mechanisms generally, but is more particularly directed to the utilization of an automatic carriage return mechanism in connection with any of the usual carriage feed mechanisms of a typewriting machine, to automatically effect a shuttle action of the travelling carriage, short of a complete return of the carriage to the left hand margin of a work sheet.

This alteration may be very easily effected in a machine, such as the well-known Elliott-Fisher typewriting machine equipped with an automatic carriage return mechanism of the type illustrated, for instance in the application of Oscar J. Sundstrand, filed June 22, 1937, Serial No. 149,571, though it is to be understood that this improvement is not confined in its use to this particular machine, or even to typewriting machines as a class, but is equally effective in adding machines having automatic carriage feed and return mechanisms of the type of that shown in the Sundstrand application.

The improvement is illustrated as embodied in a machine wherein the printing is effected character by character, as in typewriting machines, and finds its greatest use in accounting, and accounting and printing machines.

The improvement is particularly adapted for entering old balances on ledger sheets, or "heading up" ledger sheets as it is termed, wherein the ledger sheets and in some instances, the statement sheets also are successively positioned in the machine, a single entry made, the inscribed sheet or sheets removed and new ones substituted.

In setting up a machine to perform this work, the carriage is restricted to a travel across a single column space only.

However, the improvements are capable of use in other forms of bookkeeping.

To convert machines of either the adding machine or typewriting machine class, equipped with key-controlled, power-driven carriage return mechanisms, and the usual carriage feed mechanisms, into shuttle carriage machines, it is only necessary, by my improvement, to provide means to releasably retain the carriage return key continuously depressed, throughout the number of excursions of the carriage between the point to which the carriage is returned by the motor and the point at which the carriage starts its automatic return.

The key-controlled, power-operated carriage return mechanism of the above-mentioned Sundstrand application lends itself particularly well to conversion to a shuttle carriage action at will, because of the flexible or by-pass pawl control of the motor clutch, which is herein termed a "disjunctive control," it being obvious that the continued depression of a partial return key having a positive connection with the carriage return motor clutch, would be wholly ineffective to obtain the desired result.

Another object is to arrange a machine having a power-operated, travelling carriage so as to render it capable of a shuttling action in addition to the partial and complete carriage return operations, of which it is already capable, to the end that the operator may decide whether or not the carriage shall shuttle between two selected points, either or both of which points may be adjusted to regulate the length of travel of the carriage to suit the particular work to be done, or to merely return the carriage to a precedent position intermediate its extreme limits of travel, or to make a complete return to the beginning of a line.

A still further object is to utilize the partial and complete carriage return mechanism to accomplish a shuttling action of the carriage, with the addition of a single additional control element which is adjustable into and out of effective position.

More specifically, another object of the improvement is to utilize a selective partial carriage return mechanism to effect a shuttling action of the carriage through fields, the left hand limits of which are determined by the selection of one or another of the partial carriage return keys, exclusive of a complete return of the carriage to its extreme starting position.

To these and other ends, the improvement comprises certain novel features and combinations of parts, all of which will be more fully referred to hereinafter, and particularly pointed out in the claims.

In the accompanying drawings:

Fig. 1 is a perspective view of an Elliott-Fisher typewriting machine, equipped with one form of the improvement, parts being omitted, or shown in dot-and-dash outline for the sake of clearness;

Fig. 2 is a detail side view of the form of selective partial carriage return mechanism disclosed in the Sundstrand application heretofore referred to, showing the improvement applied thereto, in one of its effective positions;

Fig. 3 is a similar view, showing the improvement in another of its effective positions;

Figure 4:
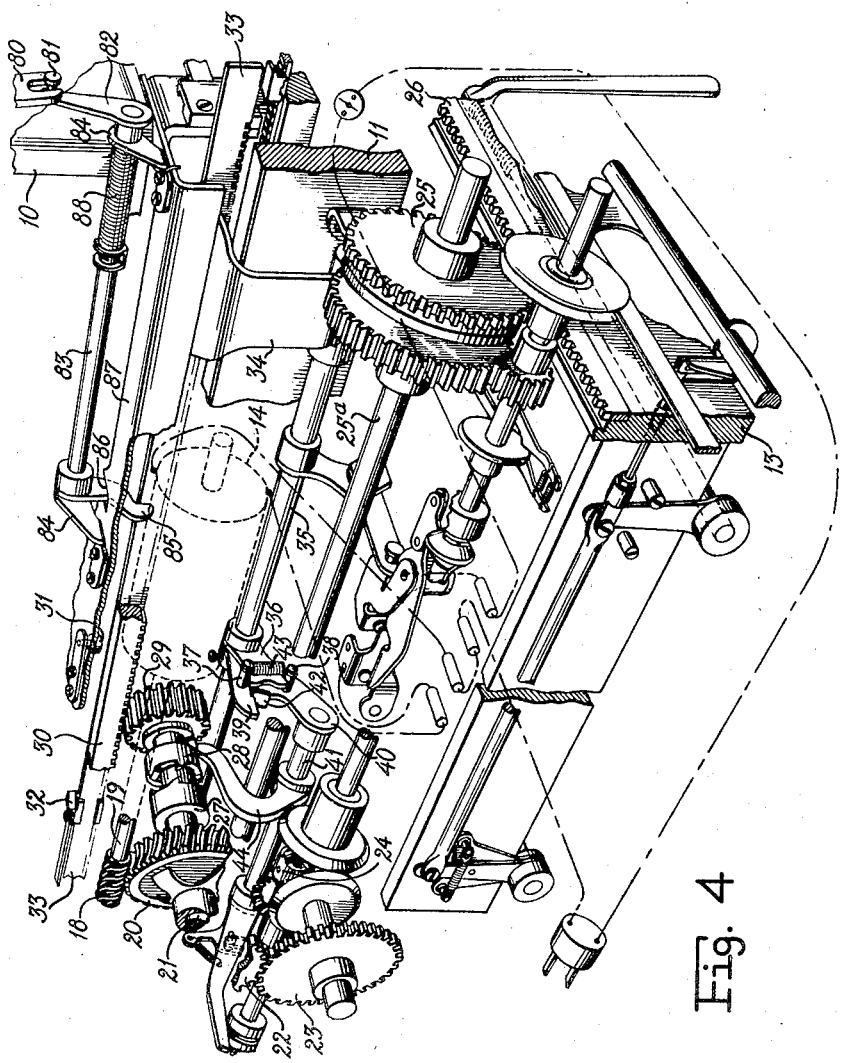

Fig. 4 is a detail perspective view of the well-known Elliott-Fisher power drive mechanism to return the carriage towards the left hand margin of a work sheet, parts being omitted to better disclose the mechanism; and Fig. 5 is a disassembled perspective view of a convenient means for association with the usual carriage feed mechanism and the partial carriage return mechanism to impart a shuttle action to the carriage.

A shuttle carriage, as understood by those familiar with the adding and typewriting machine art, is one which travels automatically between two printing points or zones. Thus, for example, in the adding machine art, it may be desired to list and add a column of amounts, and to list opposite the individual amounts identifying or designated numbers pertaining thereto.

In listing and adding checks, for example, it may be desired to list the check number and the amount for which the check of that number is drawn, in two vertical columns, as follows:

| Check No. | Amount |
|---|---|
| 422 | 965.77 |
| 423 | 430.00 |
| 424 | 37.50 |

Mechanism applied to adding machines has long been known, which, in operation, will shift the paper carriage automatically from the "designating number" column to the "amount" column, and return, the carriage normally positioning the "designating number" column at the printing point.

After setting up the designating number on the keyboard, the operator cycles the machine, the entire number is printed at once, and the paper carriage shifts the paper to position the "amount" column at the printing point. The operator then sets up the amount of the check on the keyboard, and again cycles the machine, whereupon the amount is printed in its proper column and the shuttle mechanism automatically operates to shift the carriage back to again position the "designating number" column at the printing point, preparatory to a repetition of the foregoing operations.

In the typewriting art, a shuttle carriage action is not so easily contrived for obvious reasons, one of which is that the digits composing the "designating numbers" and the "amounts" are printed one by one, instead of all at one stroke, which necessitates a denominational or letter spacing step by step travel of the carriage, but it might be attained on a machine such as is disclosed in U. S. patent to Foothorap, 1,904,127, April 18, 1933, by locating the left hand margin stop with its correlated motor drive-disengaging cam 97 (Fig. 51 of the patent) in position to arrest the carriage and interrupt the power connection to the carriage when in the "designating number" column zone, and setting the carriage return cam 102 in position for engagement by the co-acting roll 101 as the carriage, in its letter spacing travel, escapes past the "amount" column zone.

Such arrangement, however, would preclude any possibility of printing in any other zones preceding the left hand zone and succeeding the right hand zone, unless the margin stops are readjusted, and thus the operator is restricted to work of the kind set forth in the example. Furthermore, in the usual typewriting machine, as well as in the Elliott Fisher machine shown in Patent 1,904,127, it would be necessary to manually escape the carriage across the space between the two adding zones.

The present improvement enables the operator to perform a slight adjustment, and thereby readily set the machine for shuttling operation through fields of differing areas within the extreme limits of travel of the carriage, and without disrupting the adjustments for such limits.

The power-driven carriage return mechanism set forth in the Sundstrand application Serial No. 149,571, filed June 22, 1937, as applied to Elliott-Fisher writing and accounting machines, operates upon a travelling key carriage 10 mounted to travel transversely, relatively to the operator, on rails 11 forming the cross-members of a line spacing frame 12 (Fig. 1), which, in turn, is mounted for back and forth travel on side bars 13 forming part of the platen frame.

A key-controlled escapement mechanism of well-known form, and typified in Fig. 1, by the usual spring drum 15, and metal tape 16, advances the carriage in letter spacing direction.

The line space frame 12 may be advanced toward or retracted from the operator by a motor 14, shown in dotted lines in Fig. 4, mounted on the line space frame.

A worm 18 on the armature shaft 19 of the motor 14 meshes with a worm gear 20 on a suitably journaled counter-shaft 21. A gear 22 (a fragment only being shown), on the counter-shaft 21 meshes with a gear 23 forming part of a train of mechanism including a reversible clutch 24 connected with gear wheels 25 fast near opposite ends of a shaft 25ª suitably journaled at the rear end of the line space frame. The wheels 25 mesh with racks 26 on the respective side bars 13, and are driven in one direction or the other by the suitably controlled reversible clutch 24, to advance or retract the line space frame, all as more fully explained in patent to Foothorap, 1,904,127, hereinbefore mentioned.

The same counter-shaft 21 carries a drive clutch member 27 engageable and disengageable with a driven clutch member 28 axially shiftable along and rotatable with the counter-shaft, a wide carriage return pinion 29 being fast with the driven clutch member and in constant engagement with a return rack 30 fast on, and travelling with the carriage 10.

The driven clutch member 28 is automatically engaged with and disengaged from the driving clutch member 27 as follows.

As the carriage 10 reaches the end of a line, a tappet 31 (Fig. 4), wipes past a cam 32 adjustable along a universal bail 33 lying parallel to the path of travel of the carriage, the bail being mounted on the forwardly turned ends of upwardly extending arms 34 fast on a trip shaft 35 suitably journaled on the line space frame.

A trip arm 36 projects from the trip shaft 35, the arm being widened at its outer end and embraced between a pair of studs 37 and 38, one of which projects laterally from a hooked catch 39 journaled on the shaft 35 in parallelism with the arm 36, and the other of which studs projects from an arm 40 fast on a clutch-shifting shaft 41 suitably journaled in the line space frame parallel with the trip shaft 35.

The catch 39 normally engages over a lug 42 projecting from the arm 40, a tensioned spring link 43 anchored at its opposite ends to the respective studs 37 and 38, normally operating to hold the catch and arm engaged.

A clutch-shifting finger 44 projects upwardly from the clutch-shifting shaft 41, the free end of the finger being entered in a peripheral groove formed in the hub of the combined carriage return pinion 29 and driven clutch member 38.

The tappet 31, in wiping past the cam 32, rocks the universal control bail 33 forwardly, thereby raising the trip arm 36. The trip arm 36, by contact with the stud 37 on the catch, disengages the latter, releasing the clutch-shifting shaft arm 40, and at the same time, further tensions the spring link 43, which rocks the clutch-shifting shaft 41 with its arm 40 and finger 44 to engage the driven clutch member 28 with the driving clutch member 27.

In that form of the machine herein illustrated, an electric circuit is closed through the motor, but the motor may be continuously rotating, and as the circuit making and breaking can be dispensed with, and forms no part of the present invention, a description thereof is unnecessary, reference being made to patent to Foothorap 1,904,127 and to the Sundstrand application Serial No. 114,416, filed December 5, 1936, for descriptions of both types.

Power from the motor is transmitted through the clutch members 27, 28 and carriage return pinion 29, to the rack 30 to return the carriage to the beginning of a line.

A margin arrester 50 (Fig. 1), adjustable along a draw bar 51 lying in a channel formed between the front face of the rear line space rail 11 and an escapement rack 52 lying parallel therewith, and connected thereto by a web 53 (Figs. 2 and 3), defines the extreme return travel of the carriage 10, an abutment 54 (Fig. 1), on the left hand of such carriage being positioned to strike the arrester 50 and carry the latter with its draw bar 51 along through an excursion, the extent of which is determined by the distance normally existing between a travelling contact 55 and a fixed contact 56, at the right hand side of the machine, as follows.

The threaded right hand end of the draw bar 51 is adjustably connected at 55a, to a slide 57 slotted to accommodate the supporting and guiding members 58, the travelling contact 55 being formed on the left hand edge of the slide in line with the fixed contact 56 projecting forwardly from the right hand end of the rear rail 11 of the line space frame. A spring 59 conveniently anchored at one end to the fixed contact, and at its opposite end to the draw bar 51, yieldingly retains the draw bar in and returns it to its extreme limit of right hand travel, determined by one of the supporting guides 58.

The left hand end of the draw bar is connected at 55b, to another slotted, sliding support and guide 60.

Obviously, the transmission of power from the motor to the carriage must cease with or shortly prior to the arrest of the carriage at its marginal position, which interruption is readily effected by providing a cam 61 on the right hand end of the universal trip bail 33, to be wiped by one end of a floating thrust bar 62 supported at one end in an eye 63 projecting from an upright 64 on the rear of the line space frame, the thrust bar 62 being slotted near its opposite end, as at 65, to accommodate a thrust stud 66 projecting rearwardly from the slide 57.

As the slide 57 is drawn to the left by collision of the carriage abutment 54 with the marginal arrester 50, the supporting stud 66 idly traverses the slot 65 in the thrust bar 62 until the travelling contact 55 on the slide approaches its fixed contact 56, whereupon the stud 66 meets the left hand end wall of the slot 65, and as the slide continues to move leftward, the stud shifts the thrust bar 62 in the same direction to cause the free end of the bar to wipe over the cam 61 and rock the universal trip bail 33 back to its normal position. The resulting counterclockwise rotation of the trip shaft 35 (Fig. 4), rocks the arm 36 accordingly, to bear downwardly on the stud 38, thereby, through the arm 40, shaft 41 and clutch-shifting finger 44, to disengage the driven clutch member 28 from the driving clutch member 27. The spring link 43 draws the catch 39 along with the arm 36, to cause the hooked end of the catch to take over the arm 40 to again lock the driven clutch member in its disengaged position.

The slide 57, during its travel from the normal position to impinge its contact 55 with the fixed contact 56, also effects a line spacing advance of the carriage 10 and line space frame 12, in a manner not necessary to explain here.

It is often desirable to return the carriage to the left hand margin before the carriage has reached the end of its travel in letter-spacing direction, to effect which, a special key 70 (Figs. 1, 2 and 3) is provided, depression of which rocks a key lever 71 pivoted at 72 to the left hand end of the key carriage 10. A flexible pawl 73 is pivoted at 74 to the key lever 71 intermediate its ends, the pawl depending from the key lever and, when the key lever is in its normal position, the tooth of the pawl lies in line with a toe 75 (Figs. 2 and 3), formed on the forwardly projecting arm of a bell crank lever 76 pivoted concentrically with the key lever 71.

The depending pawl 73 has a cam 77 formed thereon, a spring 78 operating to hold the pawl with its tooth in line with the toe 75 of the bell crank, and the low point of the cam engaged with a stud 79 projecting from the left hand end of the carriage 10 adjacent the toe of the bell crank.

An extension 80 adjustably secured to a depending arm of the bell crank 76, projects below such depending arm, and is forked at its free end to embrace a stud 81 on an arm 82 projecting radially from one end of a horizontal shaft 83 journaled in bearings 84 (Fig. 4), on the rear of the carriage. A finger 85 depends from the opposite end of the shaft through a slot 86 in the apron 87 of the carriage, the free end of the finger normally lying behind the trip bail 33 controlling the engagement and disengagement of the carriage return clutch members 27 and 28. A spring 88 coiled about the shaft 83 normally tends to hold the bail-actuating finger 85 apart from the bail 33, and also urges the toe 75 of the bell crank 76 against the fixed camming stud 79 (see Figs. 2 and 3).

Obviously, depression of the key 70 with its pawl 73 will rock the bell crank 76 and its extension 80 clockwise, to turn the shaft 83 and force the finger 85 against the universal bail 33 to rock the latter, in any position of the carriage. The bail 33 effects connection of the clutch members 27, 28 to return the carriage 10 towards its left hand margin from an advanced position, in the manner heretofore explained.

The key 70, when depressed, presses the tooth of the pawl 73 against the toe 75 of the bell crank 76 to rock the latter, the cam node 77 of the pawl wiping along the stud 79 until, just after the finger 85 has imparted sufficient movement to the universal bail 33, the tooth of the pawl rides off of the toe 75, releasing the bell crank for return by its spring 88, wholly irrespective of the position of the key 70. My improvement requires a disjunctive connection, like that shown, or its equivalent, to effect the automatic shuttle action of the carriage, as will be presently explained.

A second key lever 90, which is deflected in a general downwardly and rearwardly direction from the keyboard, is provided with a slot 91 to accommodate an adjustable bearing 92 (Figs. 2 and 3), projecting from the key lever 71, and is afforded a floating support by a spring 93 anchored to the side of the carriage and connected to the key lever 90 near its lower end. The spring normally retains the key 94 of the lever 90, as well as the key 70, in their elevated positions, with the lower end wall of the slot 91 in contact with the bearing 92.

The extreme lower end of the floating key lever 90 terminates in a vertical stop 95 slidable up and down in a way formed by a guide plate 96 fastened to the abutment 54 depending from the lower left hand side of the carriage frame.

Because of the interconnection of the two key levers 71 and 90 at 91, 92, a staccato blow on either key will operate the key lever 71 to engage the carriage return clutch members 27, 28, and initiate a return travel of the carriage, as heretofore explained, the spring 93 operating to immediately restore the key levers to their normal positions.

Under such operation, the carriage 10 may be returned from a partially advanced position to its left hand limit of travel determined by the position of the stop 50 (Fig. 1), with which the abutment 54 collides, the stop 50 with its draft bar 51 being pushed leftwardly by the carriage until arrested by contact of the nose 55 with the stop 56, and also effecting a line spacing advance of the key carriage and its line space frame.

Return of the carriage 10 from an advanced position to a precedent position short of a complete return, or otherwise stated, a partial carriage return, is effected by selecting one or the other of the keys 70 and 94, depending upon the position to which it is desired the carriage shall return, i. e., the extent of return travel of the carriage as determined by the positions of the precedent column carriage arresters 97 and 98 adjustably located along the draw bar 51.

These precedent column carriage arresters 97 and 98 are of graduated heighths, the foremost arrester 97, or that at the right of the series being the lowest, the arrester 98 being higher, and the margin arrester 50 being the highest.

The key-controlled travelling stop 95 co-acts with one or the other of the precedent column arresters 97 and 98 depending upon which key 70 or 94 is depressed.

It will be noted that the key 70, which exercises direct control over the carriage return coupling 27, 28 to engage such coupling members, has a fixed stroke limited in one direction by contact of a lug 99 (Figs. 2 and 3), on the key stem with the upper face of a key plate 100 recessed to accommodate the stems of both keys 70 and 94, and in the other direction, by contact of a bumper 101 on the key lever 71 with the under face of the key plate 100.

The restoring spring 93 normally holds the lower end of the slot 91 in the key lever 90 against the bearing connection 92 protruding from the key lever 71, so that, upon initial depression of the key lever 70, the stud connection 92 carries the key lever 90 down with the key lever 70, until farther depression is prevented by contact of the lug 99 on the key stem with the key plate 100.

Depression of the key lever 70 effects engagement of the clutch members 27, 28 and depresses the key lever 90 through a part of its stroke, to lower the travelling stop 95 to a position wherein, upon return of the carriage, it will pass over the lowest arrester 97 and contact the next higher arrester 98, as shown in Fig. 3.

Depression of the key 94, on the other hand, imparts a full stroke to the key lever 90 to project the travelling stop 95 to its lowest point, wherein, upon return of the carriage, it collides with the lowest precedent column arrester 97 resulting in a shorter carriage return travel than when the key 70 is depressed.

During the initial depression of the key 94, the slot 91 in its key lever 90 travels relatively to the connecting stud 92 in the key lever 71, thus enabling the key lever 90 and its travelling stop 95 to gain a lead over the key lever 71, after which the upper wall of the slot picks up the connecting stud to carry the key lever 71 down during the remainder of the stroke of the key lever 90, both of which levers are finally arrested in depressed positions by contact of the lug 99 of key lever 71 with the key plate 100.

As fully explained in the Sundstrand application previously referred to, arrest of the carriage on its return to any of the selected positions, operates the line spacing mechanism through the action of the carriage on the draw bar 51.

The foregoing description relates to the Sundstrand invention, and forms a part of my improvement only insofar as it co-acts with the device now to be explained.

Regardless of which partial return key 70 or 94 was selected, the operator was heretofore compelled to retain the selected key in depressed position, to effect the interruption or cessation of the return travel of the carriage towards its left hand margin at the desired point short of a complete return.

The accomplishment of certain lines of work is much facilitated as regards a saving in labor, and an increase in the amount of work completed in any given time, as well as in conserving the energy of the operator, if a letter spacing carriage, such as above set forth is made to automatically and intermittently shuttle back to a precedent columnar position short of a complete return to the left hand margin.

For example, certain billing work requires the production of statements, having a single entry thereon, such as the "balance due" or "old balance" amounts.

With a machine equipped according to the invention, shown in the Sundstrand application aforesaid, it would be necessary for the operator, after inserting the bill or statement and the ledger or audit sheet into the machine, to write in the amount, depress the partial carriage return key and continue to hold the key depressed until the carriage has returned to, and settled in its starting position, after which, the operator would remove the inscribed bill and ledger sheet, insert a new bill and ledger sheet and repeat the process.

In an adding machine wherein all the digits of any amount are printed upon a single operation of the machine, the entry of these balances or amounts on successive bills is readily accomplished by disabling the column tabulating feed, whereupon the paper carriage would remain in proper columnar position, permitting the insertion of the successive work sheets, the setting up of the amount on the keyboard, the printing of such amount on the work sheet during a single cycle, after which the printed sheet is removed, a new one substituted and the operation repeated, the carriage and printing point being relatively fixed and immovable, during the printing of all the work sheets.

But in a typewriting adding machine, the entry of each amount is effected digit by digit, necessitating movement of the carriage, so that at the end of each printing operation, the carriage is not in position to start to print the next entry in the same column of the newly inserted work sheet, corresponding in position to the column wherein the entry was printed on the preceding work sheet.

In other words, the carriage will have passed out of the "balance" column position during the typing of the preceding entry, and must be returned to its starting point at the left hand side of such column when it is desired to print an amount in that column on each succeeding work sheet.

My improvement is designed to render such return automatic in nature, thereby relieving the operator of the labor required in so doing, to the end that an economy in time is obtained, the operator is less fatigued, and a greater amount of work is completed in a given period.

In short, I have converted the well-known typewriter carriage equipped with a letter spacing escapement controlled by depression of the usual typewriter keys, and supplemented by a manually-controlled power-driven partial return mechanism, into an automatic shuttle carriage, by a very simple and slight improvement.

To these ends, I provide means, in the form of a normally idle latch 110, adjustable to maintain either of the keys 70, 94 in their effective positions.

As has been heretofore explained, depression of the key 70 throughout its complete stroke to engage the carriage return clutch members 27, 28, is effective to partially depress the key 94 controlling the travelling stop 95, so that on the return travel of the carriage, the partially depressed stop will clear the lowest precedent column arrester 97 and collide with the next higher precedent column arrester 98, whereas selection and complete depression of the key 94 will completely depress the travelling stop 95, as well as the key 70, to enable the stop to collide with the lowest precedent column arrester 97.

Nor is it practical to partially depress the key 94 with the idea of selecting the intermediate arrester 98, because such partial depression will not rock the key lever 71 sufficiently to engage the carriage return coupling members 27, 28.

Such means 110 can be variously applied to the machine, but in the form shown, it is arranged alongside the key stem 94, and is pivoted at its lower end, at 111, to an extension 112 depending from the key lever 90 controlling the travelling stop 95. The upper free end of the latch is shouldered and projects above the key plate 100 for manipulation, a laterally extending finger piece 113 being provided to facilitate adjustment of the latch.

In its normal position, the latch lies parallel with the key stem of key 94, and is equipped with a small boss 114 which normally seats in a vertical slot 115 formed in the key stem, to lock the latch in idle position.

The upper free end of the latch may be provided with one or more stepped shoulders, as at 116, and lies in a plane above the key plate 100.

To render the latch effective, it is only necessary for the operator to depress either key 70 or 94, and at the same time and with a finger of the same hand, draw the latch forwardly by pressure against the finger piece 113 so that the front edge of the latch rides against the edge of the key plate.

Assuming the operator depresses the key 70, the initial depression of which rocks the key lever 90, the latch will move downwardly with the key lever 90 until the lower shoulder of the latch 110 escapes beneath the edge of the key plate 100, whereupon the latch, due to pressure of the operator's finger, will rock one step forwardly to position this shoulder beneath the key plate, the lug 99 on the stem of key 70 operating to limit depression of the key.

Pressure on the key 70 and latch 110 may now be released as the key will remain depressed due to engagement of the lower shoulder of the latch beneath the key plate 100.

To enable the spring 93 to restore the key levers 71 and 90, it is only necessary for the operator to rock the latch 110 rearwardly to disengage the latch shoulder from the key plate whereupon the spring 93 returns both levers 90 and 71 to their normal elevated positions.

The operation of the latch 110 when key 94 is selected for depression, is substantially similar to its operation when key 70 is depressed, the only difference being that the additional initial depression permitted the key 94 relatively to the key 70, as heretofore explained, carries the latch 110 therewith so that by the time the key 94 picks up and starts to depress the key lever 71, the upper shoulder of the latch 110 is in the position normally occupied by the lower shoulder when both keys are in their normal positions.

Consequently, depression of the key 70 throughout its stroke, by the key 94 will position the upper shoulder of the latch below the key plate 100, whereupon, due to pressure of the operator's finger on the finger piece 113, the latch shifts forwardly to hook its upper shoulder beneath the over-hanging edge of the key plate 100 and when pressure on key 94 is released, the latch will hold both keys 94 and 70 in depressed position.

The same lug 99 on the key stem of key 70 operates to limit depression of both keys.

The pivot 111 of the latch is adjustable in a slot 117 (Fig. 5), formed in the depending extension of the key 94, to minutely position the shouldered end 116 of the latch relatively to the key plate 100, a spring washer 118 being gripped between the pivot screw and its slabbed nut 119 to frictionally hold the latch in any position to which it may be rocked.

The slot 115 in the latch enables the boss 114 to co-act therewith notwithstanding such longitudinal adjustment of the latch.

The foregoing improvement, besides being useful to automatically shuttle a letter-spacing carriage back and forth between the left and right sides of columns of different widths, is also adapted to economize the time and energy of an operator in typing the addresses on the statements, without necessitating an adjustment of the left margin stop.

As is well known, the so-called window envelope which is becoming more popular, avoids the necessity of addressing an envelope, providing the address of the enclosure can be so located thereon as to register with the window in the envelope when the enclosure is properly folded and inserted into the envelope.

For practical reasons, the opening or window cannot extend to the extreme left hand edge of the envelope, but is customarily located some distance from such left hand end.

As a result, the former practice of placing the address at the extreme left margin of the work sheet is rapidly becoming obsolete, and the headings of statements are now printed with an oval or other shaped space located about midway between the side edges of the statement blank, although the items listed beneath the heading start at the left hand margin of the statement, and hence the presence of a left hand margin stop is necessitated.

My invention readily lends itself to the printing of the lines forming the name and address, one under the other, by setting either of the partial return stops 97 or 98 to arrest the carriage on its return at the point where it is desired to commence writing the name of the addressee, and retaining the selected key in its depressed position by the latch 110. The carriage is then brought to such starting point and the name written.

The automatic carriage return cam 32 (Fig. 4), will have been located a sufficient distance to the right of, or beyond the partial return stop to enable the printing point of the carriage, in its letter-spacing travel, to traverse the blank space allotted for the address on the heading.

If the typing of the name does not advance the carriage sufficiently to bring the complementary tappet 31 (Fig. 4), thereon into contact with the co-acting cam 32, the usual release key (not herein shown, but present in Elliott-Fisher typewriting machines, as in patent to Foothorap, 1,203,519, October 31, 1916), may be depressed to release the escapement control and enable the carriage to coast under the influence of its spring drum 15 until the carriage tappet 31 wipes over the carriage return clutch control cam 32, whereupon the motor 14 will drive the carriage towards its left hand margin until farther travel is arrested by contact of the set travelling carriage stop 95 with the appropriate arrester 97 or 98, in position to start typing the next line of the address, and so on, the initial letters of all lines of the address lying in vertical alinement.

Customarily, the operator will depress and latch the desired partial carriage return key, and proceed to fill in the addresses on all the bills to be made out, after which, the latch 110 will be released, the set stop 95 returned to its upper idle position by the spring 93, whereby to enable the carriage to be automatically returned from an advanced position to the left hand margin, and the bills re-inserted one by one for the typing of the items of the account, it being obvious that no adjustment of the left hand margin stop has been required, to enable the automatic partial return of the carriage when the bills were being addressed.

The improvement is also susceptible of use in other typing operations, but the foregoing examples illustrate the practical application of the idea.

Changes may be made in the form and arrangement of the several parts, and certain of the parts may be omitted without departing from the spirit and scope of this invention.

What is claimed as new is:

1. In a writing machine, the combination with a frame structure; a traveling carriage structure, including a carriage; means to advance the carriage in one direction; a motor to return the carriage towards the beginning of a line; a normally idle power connection between the motor and the carriage; and carriage-controlled means to render the power connection effective, upon arrival of the carriage at a predetermined point in its advance; of co-acting stop elements, including a plurality of stop members arranged in spaced relation and mounted on one of said structures, and a normally idle manipulative stop device on the other of said structures, and adjustable from its idle position to one or another effective position to select one or another of the said spaced stop members with which it contacts to arrest the carriage at different positions on its return, short of a complete return; a second manipulative device to control the power connection independent of the first-named manipulative device which controls the extent of return of the carriage; means to connect the manipulative devices for conjoint movement through at least a portion of their travel upon operation of either device; and means to convert the carriage return mechanism into an automatic shuttle carriage mechanism, including a single, normally ineffective retaining device adjustable to one or another effective position to hold the manipulative stop device controlling the extent of return in one or the other of its effective positions, the retaining device in either of its effective adjustments, adapted to hold the second-named manipulative device in operated position.

2. In a writing machine, the combination with a frame structure; a traveling carriage structure, including a carriage; means to advance the carriage in one direction; a motor to return the carriage towards the beginning of a line; a normally idle power connection between the motor and the carriage; and carriage-controlled means to render the power connection effective, upon arrival of the carriage at a predetermined point in its advance; of co-acting stop elements, including a plurality of stop members arranged in spaced relation and mounted on one of said structures, and a normally idle manipulative stop device on the other of said structures, and adjustable from its idle position to one or another effective position to select one or another of the said spaced stop members with which it contacts to arrest the carriage at different positions on its return, short of a complete return; a second manipulative device to control the power connection independent of the first-named manipulative device which controls the extent of return of the carriage; means to connect the manipulative devices for conjoint movement through at least a portion of their travel upon operation of either device; and means to convert the carriage return mechanism into an automatic shuttle carriage mechanism, including a single latching means mounted on the manipulative stop device, and adjustable from idle position to one or another of a plurality of effective positions, to releasably retain the manipulative stop device in one or the other of its effective positions, said latching means, in either of its effective positions, adapted to hold the second-named manipulative device in operated position.

3. In a writing machine, the combination with a frame structure; a traveling carriage structure, including a carriage; means to advance the carriage in one direction; a motor to return the carriage towards the beginning of a line; a normally idle power connection between the motor and the carriage; and carriage-controlled means to render the power connection effective, upon arrival of the carriage at a predetermined point in its advance; of co-acting stop elements, including a plurality of stop members arranged in spaced relation and mounted on one of said structures, and a normally idle manipulative stop device on the other of said structures, and adjustable from its idle position to one or another effective position to select one or another of the said spaced stop members with which it contacts to arrest the carriage at different positions on its return, short of a complete return; a second manipulative device to control the power connection independent of the first-named manipulative device which controls the extent of return of the carriage; means to connect the manipulative devices for conjoint movement through at least a portion of their travel upon operation of either device; and means to convert the carriage return mechanism into an automatic shuttle carriage mechanism, including a single latching means mounted on the manipulative stop device, and provided with stepped shoulders, the latching means adjustable from idle position to one or another of a plurality of effective positions; and means engageable by one or the other of the stepped shoulders depending upon the particular effective position to which the latching means is shifted, to releasably retain the manipulatively adjustable stop device controlling the extent of carriage return in the corresponding effective position, the latching means in either of its effective positions, adapted to hold the second-named manipulative device in operated position.

4. In a writing machine, the combination with a frame structure; a traveling carriage structure, including a carriage; means to advance the carriage in one direction; a motor to return the carriage towards the beginning of a line; a normally idle power connection between the motor and the carriage; and carriage-controlled means to render the power connection effective, upon arrival of the carriage at a predetermined point in its advance; of co-acting stop elements, including a plurality of stop members arranged in spaced relation and mounted on one of said structures, and a normally idle manipulative stop device on the other of said structures, and adjustable from its idle position to one or another effective position to select one or another of the said spaced stop members with which it contacts to arrest the carriage at different positions on its return, short of a complete return; a second manipulative device to control the power connection independent of the first-named manipulative device which controls the extent of return of the carriage; means to connect the manipulative devices for conjoint movement through at least a portion of their travel upon operation of either device; and means to convert the carriage return mechanism into an automatic shuttle carriage mechanism, including a single normally ineffective latching means adjustable to one or another effective position, in one of which, it operates to releasably retain both manipulative devices at one limit of their conjoint movement, representing the operated position of the manipulative device controlling the power connection, and one of the effective positions of the manipulative device which controls the extent of return of the carriage, whereby to enable it to select a corresponding stop member, the latching means, in the other of its effective positions, operative to releasably retain the manipulative device controlling the power connection in its same operated position, and the manipulative device controlling the extent of carriage return in the other of its effective positions, to co-act with a different stop member.

ELMER L. WISE.